(12) United States Patent
Weiss

(10) Patent No.: US 7,493,583 B1
(45) Date of Patent: Feb. 17, 2009

(54) METHOD AND APPARATUS FOR CONTROLLING CROSSTALK, POWER AND YIELD IN NANOMETER TECHNOLOGY ICS

(76) Inventor: Jonathan Weiss, 5718 Charles Cir., Lake Oswego, OR (US) 97035

( * ) Notice: Subject to any disclaimer, the term of this patent is extended or adjusted under 35 U.S.C. 154(b) by 402 days.

(21) Appl. No.: 11/150,866

(22) Filed: Jun. 10, 2005

Related U.S. Application Data

(60) Provisional application No. 60/578,585, filed on Jun. 10, 2004.

(51) Int. Cl.
*G06F 17/50* (2006.01)
(52) U.S. Cl. .......................................... 716/10; 716/13
(58) Field of Classification Search ................. 345/441, 345/423
See application file for complete search history.

(56) References Cited

U.S. PATENT DOCUMENTS

| | | | |
|---|---|---|---|
| 6,363,518 B1 * | 3/2002 | Lee .............................. | 716/10 |
| 6,397,169 B1 * | 5/2002 | Shenoy et al. ................. | 703/14 |
| 2003/0038850 A1 * | 2/2003 | Stevens ....................... | 345/964 |
| 2004/0098684 A1 * | 5/2004 | Amekawa ...................... | 716/6 |
| 2005/0053056 A1 * | 3/2005 | Vorbach et al. ............. | 370/360 |

OTHER PUBLICATIONS

Rao et al., Introductory Course on Theory and Practice of Mechanical Vibrations, 1999, pp. 350 and 360.*

He et al., "Simultaneous Wire Sizing and Wire Spacing in Post-Layout Performance Optimization", Design Automation Conference 1998, pp. 373-378 (Feb. 1998).*

\* cited by examiner

*Primary Examiner*—Jack Chiang
*Assistant Examiner*—Aric Lin
(74) *Attorney, Agent, or Firm*—Olympic Patent Works, PLLC

(57) ABSTRACT

A method for controlling crosstalk, power and yield in nanometer-technology integrated circuits ("ICs") is based on a performance driven space optimization technique that minimizes the coupling capacitance between the interconnecting wires. Given a routed IC design, virtual compression-springs are inserted between all the elements of the design creating a mesh of springs. The design is then perturbed, or shaken, by transforming the spring system into a minimum-energy problem, a solution for which reduces or eliminates crosstalk violations, minimizes power and increases yield as the springs reach minimum energy state. In a described method, the primitives of a given IC layout are defined in terms of object points. In a first step, a mesh of virtual compression springs connecting all the layout primitives is generated from the object points. The spring constant for each virtual spring embedded between interconnecting wires is chosen to follow a relationship between a slack function and the separation distance between the interconnecting wires. In a second step, the design is shaken by minimizing the energy of the virtual compression-spring-loaded-system, resulting in new object points and new positions for the springs and the interconnecting wires.

3 Claims, 3 Drawing Sheets

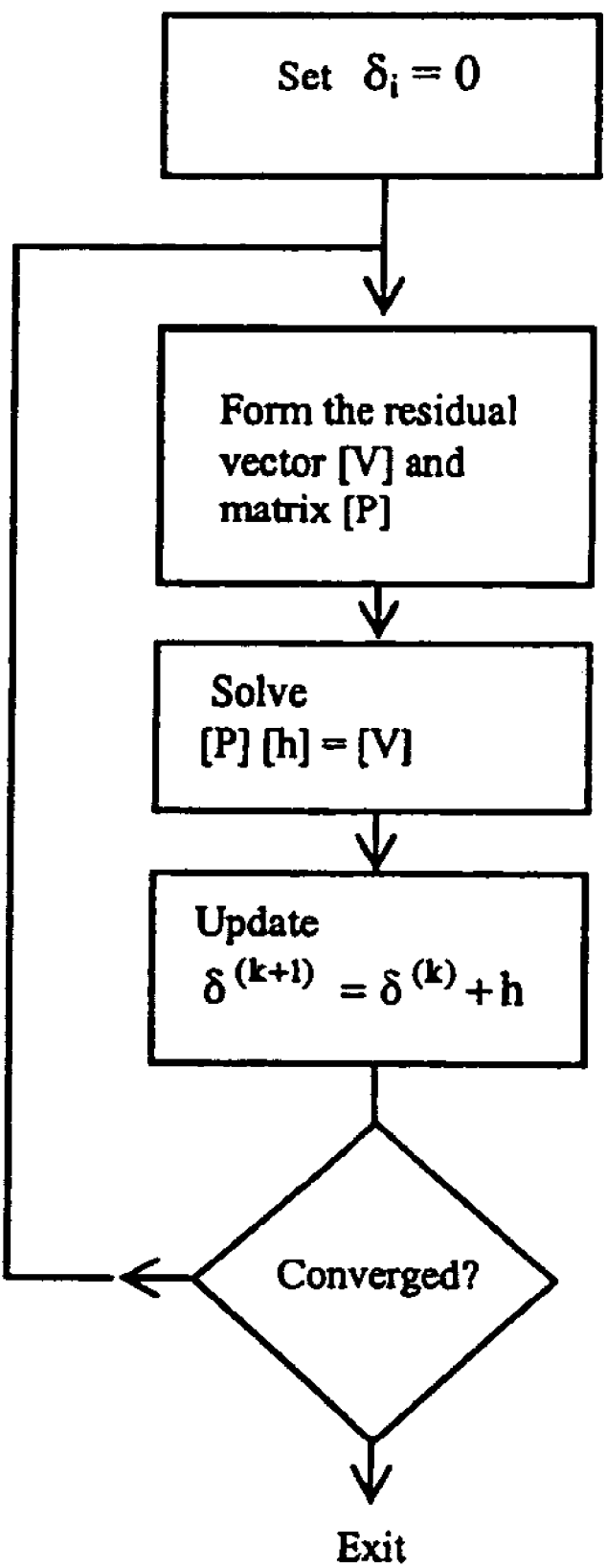
FIG. 6 The Newton Algorithm

METHOD AND APPARATUS FOR CONTROLLING CROSSTALK, POWER AND YIELD IN NANOMETER TECHNOLOGY ICS

CROSS-REFERENCE TO RELATED APPLICATION

This application claims the benefit of Provisional Patent Application No. 60/578,585, filed Jun. 10, 2004.

TECHNICAL FIELD OF THE INVENTION

The present invention relates generally to a method and apparatus for controlling crosstalk, power and yield in nanometer-technology ICs, and more particularly, to a method and apparatus that uses virtual compression springs to increase the separation distance between the interconnecting wires, reducing their coupling capacitance, and consequently minimizing or eliminating crosstalk, minimizing power and increasing yield when sufficient space is available within the chip area.

BACKGROUND OF THE INVENTION

In nanometer process geometries, issues relating to timing, signal integrity, manufacturing and time to market are presenting new challenges to designers and EDA tools. Timing is interconnects dominated. In 130 nm designs, for example, interconnect delay accounts for about 80% of the path delay, while coupling capacitance accounts for approximately 70% of the total wire capacitance. Crosstalk, which is the most common and severe signal integrity problem, may cause induced glitches and timing errors. Timing constraints are generally managed during floor planning by controlling interconnect length, and by sizing cells. Crosstalk constraints on the other hand, may only be addressed once the absolute positions of the interconnecting wires are known, generally after routing is determined. Crosstalk is an electrical phenomenon that may occur when spatial correlations between the interconnecting wires exist or, in other words, when the geometry of the interconnecting wires is arranged in specific configurations that cause coupling capacitance to increase dramatically. Crosstalk makes a-priori prediction of timing closure difficult or impossible.

Crosstalk is generally managed by upsizing drivers for setup-time violations, inserting buffers for hold-time violations, shielding critical nets, and controlling spacing and parallelism. However, there is no way to optimally trade-off between resizing cells and fine-tuning the coupling capacitances, forcing designers to use either method, or both, in brute force.

Power consumption has been growing exponentially with each process generation. In 90 nm process geometry for example, leakage power contributes approximately half of the total power budget, with active power dissipation from device switching making up the rest. Fixing crosstalk by upsizing cells and inserting delay cells makes a bad situation worse with respect to power. Therefore, power is managed by reducing voltages, leading to a greater sensitivity to rail voltage variations and smaller margins for switching noise. As coupling capacitances continue to increase, so does the switching noise—which is a direct result of the ever-shrinking process geometries. The dramatic increase of the coupling capacitances in nanometer technology is making a-priori prediction of timing closure early in the design process, and a first pass design success "almost" impossible—a vicious circle has been created.

At 180 nm and below, aggressive resolution enhancement techniques (RET) are typically employed in order to assure that the resulting silicon pattern will match the layout exactly. Nevertheless, the ability to apply RET effectively is limited by the layout itself. To follow best practices for example, designs are required to meet minimum design rules—spacing rules, reliability rules (via stacking and minimum area rules), and process antennas rules, making RET difficult to apply. When design rules are relaxed from the minimum specifications in selected areas of the chip, RET is easier to apply, resulting in an overall yield increase without dramatically affecting design size or functionality.

Ideally, crosstalk, power and yield problems should be managed by minimizing the coupling capacitances between the interconnecting wires. It is well known that for a given area constraint, performance driven wire-spacing optimization is the most effective method for reducing interconnect coupling capacitances, reducing power, and increasing yield. Optimization based on a tradeoff between fine-tuning the coupling capacitances and resizing cells, in conjunction with buffer insertion may be the most effective method yet. Wire-spacing techniques hold the key to addressing the impact of geometrical constraints on parasitic, timing, power, and yield.

Wire-spacing techniques rely on compaction and spacing. Because compaction is a 2-D NP-complete problem it is extremely difficult to solve. As a result two 1-D problems are typically solved; X followed by Y or vice versa. Unfortunately, minimizing crosstalk between horizontal segments may maximize crosstalk between vertical segments, resulting in a redistribution of the problem. Therefore, there is no trivial way to automatically control spacing and parallelism, which are both critical to minimizing the coupling capacitances.

Ameliorating crosstalk noise during routing implies prescience because knowledge of the expected crosstalk due to nets that are not yet routed is needed in order characterize and attempt to minimize crosstalk. During global routing, crosstalk estimation may be inaccurate, but the freedom to control crosstalk is nearly unrestricted. On the other hand, during detail routing, crosstalk estimation may be more accurate, but the freedom to control crosstalk is more restricted. Therefore, routers attempt to constrain the routing by meeting not only manufacturing rules, but also meeting blanket-rule constraints for net parallelism and spacing, needed for crosstalk control. The blanket application of net parallelism and spacing rules may over-design crosstalk for some nets, while under-design crosstalk for others. When routing is over-constrained, irresolvable congestion problems often occur making it difficult to achieve 100% routing completion. As a result, worse case rules are typically applied and difficulties with routing completion often occur. Finally, when nets violate crosstalk specifications, which they generally do, designers have no choice but to locally 'fix' those nets manually, one net at a time. Buffers and repeaters are often inserted, drivers are resized, wires' width and spacing are modified, and parallelism is minimized.

Post-routing algorithms to minimize crosstalk violations have been studied extensively in the scientific literature. They can be classified into rules that attempt to decrease crosstalk by changing the spacing between the interconnecting wires, and rules that attempt to decrease crosstalk by changing the adjacencies among the interconnecting wires. Both of these rule classes suffer from severe limitations. First, even though spacing is a two-dimensional problem, it is usually carried out as two independent, one-dimensional steps. Vertical coupling is accounted for by introducing a penalty function to make sure that the final crosstalk will not exceed the initial crosstalk. Second, current spacing algorithms adjust positions of the interconnecting wires locally within routing region, not globally within the entire routing area of an IC. Third, it has been noted that the non-linearity of the objective functions involving crosstalk makes it difficult to develop efficient algorithms for their optimization. Furthermore, crosstalk for interconnecting wires that are placed into final positions early in the routing process is computed using estimations for coupling with neighboring wires that have not yet been placed. Iterative rip-up and reroute may be used to remedy this problem. However, depending on when rip-up and reroute is performed during the routing process, routing space may or may not be available, and rip-up may be so extensive that a complete re-route becomes necessary. Although in general, post-routing optimization is less flexible in moving the interconnecting wires around than during detail routing, it is still the best way to reduce coupling capacitances and hence crosstalk between the interconnecting wires for a general layout problem.

SUMMARY

A method for controlling crosstalk, power and yield in nanometer-technology integrated circuits ("ICs") is based on a performance driven space optimization technique that minimizes the coupling capacitance between the interconnecting wires. Given a routed IC design, virtual compression-springs are inserted between all the elements of the design creating a mesh of springs. The design is then perturbed, or shaken, by transforming the spring system into a minimum-energy problem, a solution for which reduces or eliminates crosstalk violations, minimizes power and increases yield as the springs reach minimum energy state. One described embodiment of the method comprises a two-step automatic process that needs no user input once a physical layout of the IC has been provided to the apparatus. In the described method, the primitives of a given IC layout are defined in terms of object points. Each primitive is a separate geometric region. All the primitives of a given layout have inter-related electrical properties that are very complex and that depend on many different variables. In a first step of the described method, a mesh of virtual compression springs connecting all the layout primitives is generated from the object points. The spring constant for each virtual spring embedded between interconnecting wires is chosen to follow a relationship between a slack function (crosstalk and power) and the separation distance between the interconnecting wires. For crosstalk for example, a suitable relationship can be derived by performing transmission line analysis and simulation. Other spring constants may be derived from the physical properties of the layout. In a second step of the described method, the design is shaken by minimizing the energy of the virtual compression-spring-loaded-system, resulting in new object points and new positions for the springs and the interconnecting wires. As the interconnecting wires move apart, their coupling capacitances is reduced, and consequently crosstalk and power are minimized, yield is maximized as long as sufficient space is available within the chip area.

BRIEF DESCRIPTION OF THE DRAWINGS

FIG. 6: A Newton iterative process.

DETAILED DESCRIPTION

Figure 1:
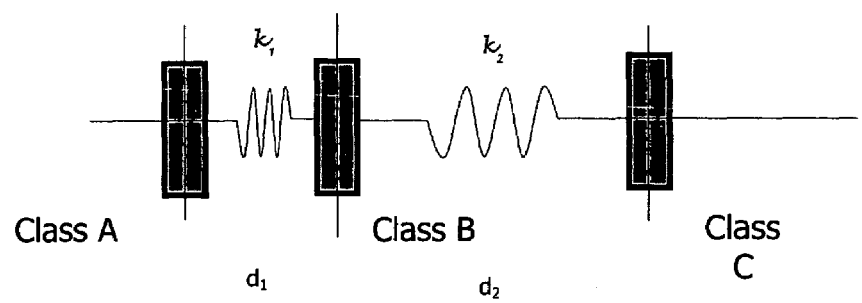
FIG. 1: A virtual compression spring embedded between two interconnecting wires.

The described method comprises a two-step automatic process that requires no user input once a geometric representation of the object has been provided to the apparatus. The primitives of a given IC layout are defined in terms of object points. Each primitive is a separate geometric region. All the primitives of a given layout have inter-related electrical properties, which are very complex and generally depend on many different variables. In a first step of the described method, a mesh of virtual non-linear compression springs connecting all the layout primitives is generated from the object points. Along each spring spacing, slack or power variations may be described.

The spring constant for each virtual spring embedded between interconnecting wires is chosen as follows:
1. Unity spring constants for spacing variations.
2. Non-linear spring constants for slack-variation versus separation distance derived from crosstalk specifications using signal integrity analysis or other analytical models such as $2\pi$ crosstalk model.
3. A "family" of non-linear spring constants for slack-variation versus separation distance as a function of driver strength (resizing).
4. Non-linear spring constants for power-variation.

For example, the relationship between crosstalk slack per unite length of parallelism and separation distance for a specific driver and load combination can be derived by performing transmission line analysis and simulation using off the shelf transmission-line analysis programs. The data obtained from the transmission line analysis is curve fitted, by quadratic or higher degree functions, to ensure that a first derivative of the curve is continuous. For resizing drivers, a family of crosstalk slack per unit length of parallelism and separation distance can be derived from analysis. In a second step, the design is perturbed, or shaken, by minimizing the energy of the virtual compression-spring-loaded-system, resulting in new object points and new positions for the springs and the interconnecting wires. The interconnecting wires move apart, reducing coupling capacitance and consequently minimizing or eliminating crosstalk, minimizing power and maximizing yield when sufficient space is available within the chip area.

In one, described embodiment, the method and apparatus comprise a computer program executable on a digital computer. The described method comprises a two-step process that needs no user input once the physical layout of an IC has been provided to the apparatus. In the method, the physical layout of an IC is obtained from design tools that the designer uses for IC design, and the physical layout is entered into a database associated with the program. The primitives of an IC layout include, but are not limited to, cells, blocks, layers, vias, power rails, ground rails, interconnecting wires, nets, etc. All primitives are defined in terms of object points. Each primitive is a separate geometric region. All the primitives of a given layout have inter-related electrical properties, which are very complex and depend on many different variables. A database associated with the present method would thus store a list of primitives, each primitive associated with one or more object points and with parameters describing the primitive's electrical properties.

Figure 2:
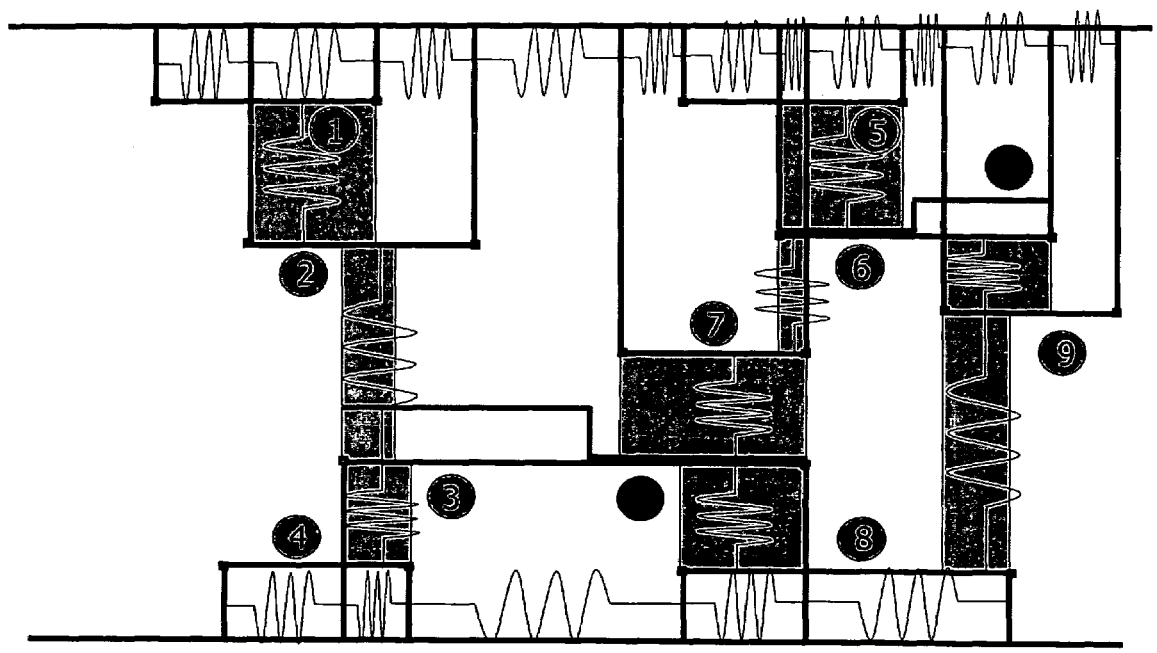
FIG. 2: An example of a mesh of virtual compression spring system of interconnecting wires.

In a first step, a mesh of virtual compression springs connecting all the layout primitives is created from the object points. Primitives of a given IC layout and their object points may be marked as moveable, or reserved. Reserved primitives, for example, are not allowed to move. Variations in the x-direction or y-direction for reserved primitives are generally not allowed. The interconnecting wires are separated into two sub-groups: (1) horizontal nets; and (2) vertical nets. A net connects two pins. A path is a collection of nets, and might span multiple layers. Consider a horizontal net $H_i$. A virtual compression spring is inserted between it and its closest neighbor above and below. In the same way, consider a vertical net $V_j$. A compression spring is embedded between it and its closest neighbor to the right and to the left. When a net has more than one virtual spring attached between it and its closest neighbor, it may be refined by splitting it into sub-nets. This allows for an efficient utilization of space. This process is repeated until a virtual compression spring is embedded between all the layout primitives. FIG. 1 illustrates the virtual compression spring embedded between two interconnecting wires. FIG. 2 illustrates an example of a mesh of virtual compression spring system of horizontal and vertical nets. The red net in FIG. 2 illustrates the process of net refinement. All the springs, and the ends of the springs are numbered, and lists of the spring-end coordinates relative to an arbitrary (x,y) coordinate system are created.

The interconnecting wires are classified and categorized based on the electrical characteristics of the drivers and loads that are attached to them. All interconnecting wires having the same driver characteristics are grouped together. Assuming there are M such groups, a cache of crosstalk-per-unit length values is built by performing M*(M−1)/2 transmission line analyses between the groups. Each analysis is repeated 3 times. The first time, the distance between the interconnecting wires is the minimum spacing allowed by the manufacturing process. The second time, the distance between the interconnecting wires is doubled, the third time it is tripled. In the transmission line analyses, the relative positions of the drivers and loads are maintained. The values of the crosstalk per unite length of parallelism are curve-fitted by a quadratic or higher degree function to ensure that a first derivative of the curve is continuous.

In general, the maximum crosstalk that a net can tolerate varies from net to net, and is usually fixed by the designer based on the electrical properties of the circuit. The difference between the maximum tolerable crosstalk and the actual crosstalk, as determined by standard transmission line analysis, is called "slack." To perform the standard transmission line analysis, a cache of capacitance values, and net configuration cross-sections are constructed assuming coupling occurs from visible interconnecting wires to the left and to the right of the main interconnecting wire relative to the ground and power rails. It is the goal of our method and apparatus to achieve zero slack.

Figure 3:
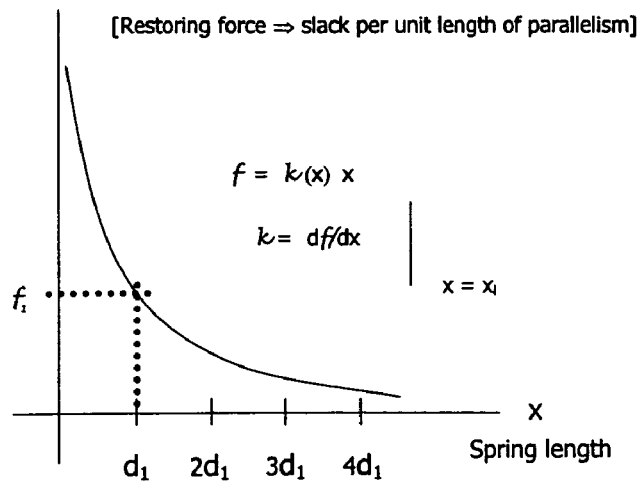
FIG. 3: Variations of crosstalk slack per unit length of parallelism versus distance of separation obtained from analysis.
Figure 4:
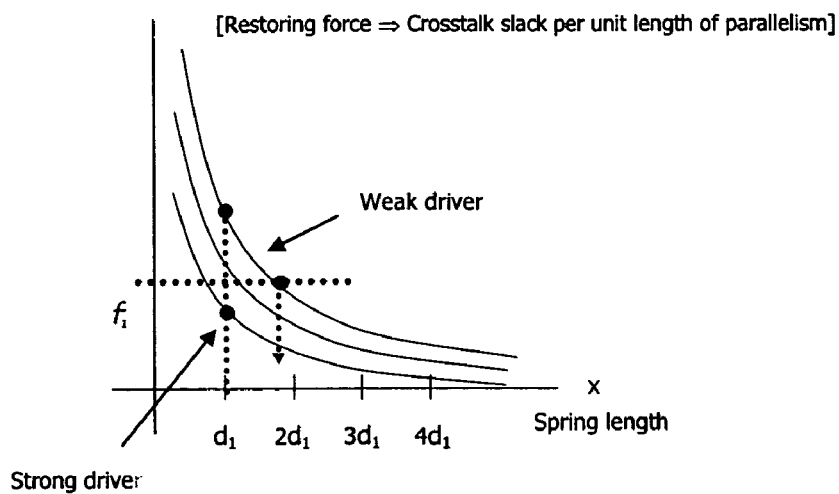
FIG. 4: Variations of crosstalk slack per unit length of parallelism as a function of driver strength versus distance of separation obtained from analysis.
Figure 5:
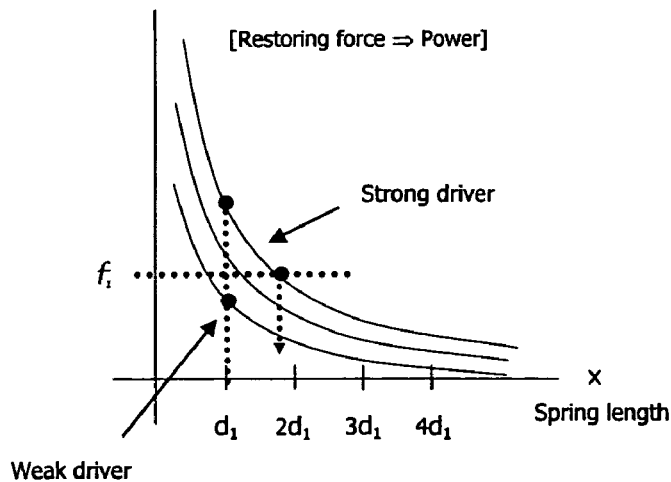
FIG. 5: Variation of power versus distance of separation obtained from analysis

FIG. 3 shows variations of crosstalk slack per unit length of parallelism with the distance of separation. This curve is used to derive a relationship between the spring constant and the separation distance. FIG. 4 shows a family of crosstalk per unit length of parallelism as a function of driver strength (resizing) with distance of separation. It shows that for the same separation distance a strong driver will result in less crosstalk than a weak driver. This provides for an automatic way to trade off between device strength and distance of separation. Other spring constants are assumed to be constants, and are automatically derived from the physical properties of the layout. In a second step, the design is shaken, allowing the virtual springs to reach a minimum energy state. This is achieved by minimizing the functional $$\pi = \int \{U(\xi) + \Psi(\xi)\} d\Omega \quad (1)$$

U is the internal strain energy of the springs and Ψ the potential energy of the springs due to the external forces. In general, to minimize (1) the displacement of the virtual springs is approximated by $$u = \Sigma \delta_i \alpha_i(\xi) \quad (2)$$

where $\alpha_i$ are standard interpolation functions and $\delta_i$ the displacement values at the ends of the springs. The minimization of (1) requires that a first derivative of the functional with respect to $\delta_i$ vanish over the entire mesh for all unconstraint displacements, $$\frac{\partial \pi}{\partial \delta_i} = \pi' = 0 \quad (3)$$

It may be noted that equation (3) is not intrinsically tied to linear springs, but is valid for nonlinear springs as well. In the present embodiment, the solution to equation (3) is obtained by expanding the first derivative of the functional as a Taylor series near the solution point $\theta = (\theta_o - h)$ where θ represents an incorrect but close estimate to the solution $\theta_o$. From the Taylor series expansion we get $$h = -[\pi''(\theta)]^{-1}[\pi'(\theta)] \quad (4)$$

Equation (4) provides a prescription for calculating h from the approximation to the solution. An iterative procedure may now be constructed by setting $$\delta^{(k+1)} = \delta^{(k)} + h \quad (5)$$

Where $$h = -[P^{(k)}]^{-1}[V^{(k)}] \quad (6)$$

The Newton iterative process runs as shown in FIG. 6

Where $$[V] = k \begin{bmatrix} 1 & -1 \\ -1 & 1 \end{bmatrix} \begin{bmatrix} \delta_1 \\ \delta_2 \end{bmatrix} - \begin{bmatrix} f_1 \\ f_2 \end{bmatrix}$$

$$[P] = k \begin{bmatrix} 1 & 0 \\ 0 & 1 \end{bmatrix} + \frac{1}{2} \frac{dk}{d(\Delta^2)} [\delta_1 \ \delta_2] \begin{bmatrix} 1 & -1 \\ -1 & 1 \end{bmatrix} \begin{bmatrix} 1 & -1 \\ -1 & 1 \end{bmatrix} \begin{bmatrix} \delta_1 \\ \delta_2 \end{bmatrix}$$

$[f_1 f_2]$=Vector of slack values and $\Delta = (\delta_2 - \delta_1)$

Each virtual spring has two nodes, which are numbered node 1 and node 2 according to a disjoint or local numbering scheme. Equivalently, there exists a conjoint or global numbering scheme that represents the mesh of the virtual springs in a loaded system. The global numbering scheme stars at 1 and terminates at NODES, which is the total number of virtual-spring ends in the mesh. For each spring, the entries of [V] and [P] are calculated, first based on the local numbering scheme, and subsequently added at the proper location in the global [V] and [P] matrices. Once the global [V] and global [P] matrices have been assembled, the vector [h] is calculated by solving the matrix equation [P][h]=V. In this embodiment we used the preconditioned conjugate gradient method to solve the matrix equation, although other good choices exist.

The size of the global [V] vector is NODES. The global [P] is a matrix of order NODES. It is symmetric, sparse and positive definite. The number of springs is approximately equal to the number of nets−1, and the number of NODES is approximately equal to the number of the virtual springs+1.

The matrix [P] is singular and boundary conditions must be applied to prohibit rigid body motion. For interconnecting wires that have only spacing requirements attached to them the spring constant is set to 1. At each iteration, the slack is determined from the actual distance between the interconnecting wires minus the minimum allowed distance. For those interconnecting wires that are at the minimum distance the slack is zero. For interconnecting wires that have crosstalk specifications attached to it, the slack is determined from the actual crosstalk minus the maximum tolerable crosstalk. It should be noted that at the start of the iterations the weakest allowed drivers are always used first. This typically require more space, however, if no spare space is available, the process will continue with stronger drivers until an "optimum" solution is reached.

In the described embodiment, we represent k the spring constant as cubic splines with equi-spaced knots, although other good choices such as Hermite interpolation polynomials may be used. Slope continuity is desirable because it allows the Newton process to converge smoothly, without missteps which may occur if the first derivative of the spring constant k, and hence the matrix [P], undergoes sharp changes. The Newton iteration process is generally stable. It converges very rapidly, and requires little if any additional computer memory. The theoretical convergence rate is quadratic near the solution point. This means that the number of significant digits in each iteration trial solution should approximately double the number of significant digits in the proceeding one. True quadratic convergence is in fact only obtained very near the solution. Nevertheless, more than seven or eight Newton steps are not required very often for precision exceeding the level physically justifiable.

The output from the Newton algorithm is the displacements $\delta_i$, which represent the horizontal and vertical distances the spring ends move from their original position. The interconnecting wires move apart, reducing the coupling capacitance and consequently minimizing or eliminating crosstalk as long as sufficient space is available within the chip area.

Having illustrated and described the principles of the invention in a preferred embodiment, it should be apparent to those skilled in the art that the invention can be modified in arrangement and detail without departing from such principle. For example, although springs are easily described mathematically, and provide for a tractable computation, many other physical and mathematical entities may be employed to model constraints suitable for producing an optimized spatial configuration of wires, traces, and other IC components that may suffer from crosstalk when located in close proximity. In addition, additional optimization criteria may be included in the mathematical model, including materials costs, fabrication costs, additional types of component-location-related interference, and other factors. Although a Newton method is used, in the described embodiment, to determine the minimum energy configuration for the virtual spring system, other minimization techniques may be employed. In addition, an almost limitless number of different embodiments are possible, using different IC design encodings, databases, and cross-talk analysis software, written in any number of different programming languages for execution on any of many different hardware platforms and for many different operating systems, using an almost limitless number of different modular organizations, control structures, variables, and other programming characteristics. Methods of the present invention may also be encoded directly into hardware, firmware, or a combination of two or more of hardware, firmware, and software.

The invention claimed is:

1. A method for controlling crosstalk, power and yield in a nanometer-technology integrated circuit, the method comprising:
   defining primitives of the integrated circuit as object points;
   generating a system represented as a mesh of virtual compression springs connecting the object points; and
   minimizing energy of the system, resulting in new object points and new positions for the springs,
   wherein non-linear spring constants are assigned to virtual compression springs and represented by slack-variation per unit length versus separation distance, derived from one or more of:
   transmission line analysis and simulation,
   derivations from physical properties of a layout,
   slack-variation versus capacitance,
   crosstalk analysis using signal integrity analysis, and
   analytical methods such as $2\pi$ crosstalk noise model.

2. A method for controlling crosstalk, power and yield in a nanometer-technology integrated circuit, the method comprising:
   defining primitives of the integrated circuit as object points;
   generating a system represented as a mesh of virtual compression springs connecting the object points; and
   minimizing energy of the system, resulting in new object points and new positions for the springs,
   wherein non-linear spring constants are assigned to virtual compression springs and are represented by power constraints versus separation distance, derived from one or more of:
   power analysis and simulation,
   power constraints versus capacitance, and
   derivations from physical properties of a layout.

3. A method for controlling crosstalk, power and yield in a nanometer-technology integrated circuit, the method comprising:
   defining primitives of the integrated circuit as object points;
   generating a system represented as a mesh of virtual compression springs connecting the object points; and
   minimizing energy of the system, resulting in new object points and new positions for the springs,
   wherein the virtual compression springs are associated with spring constants which are represented as one of:
   cubic splines with equi-spaced knots; and
   Hermite interpolation polynomials.

* * * * *